3,266,307
ADIABATIC CALORIMETER
Francis de Winter, Cambridge, Mass., assignor to Dynatech Corporation, Cambridge, Mass.
Filed Dec. 8, 1964, Ser. No. 416,800
10 Claims. (Cl. 73—190)

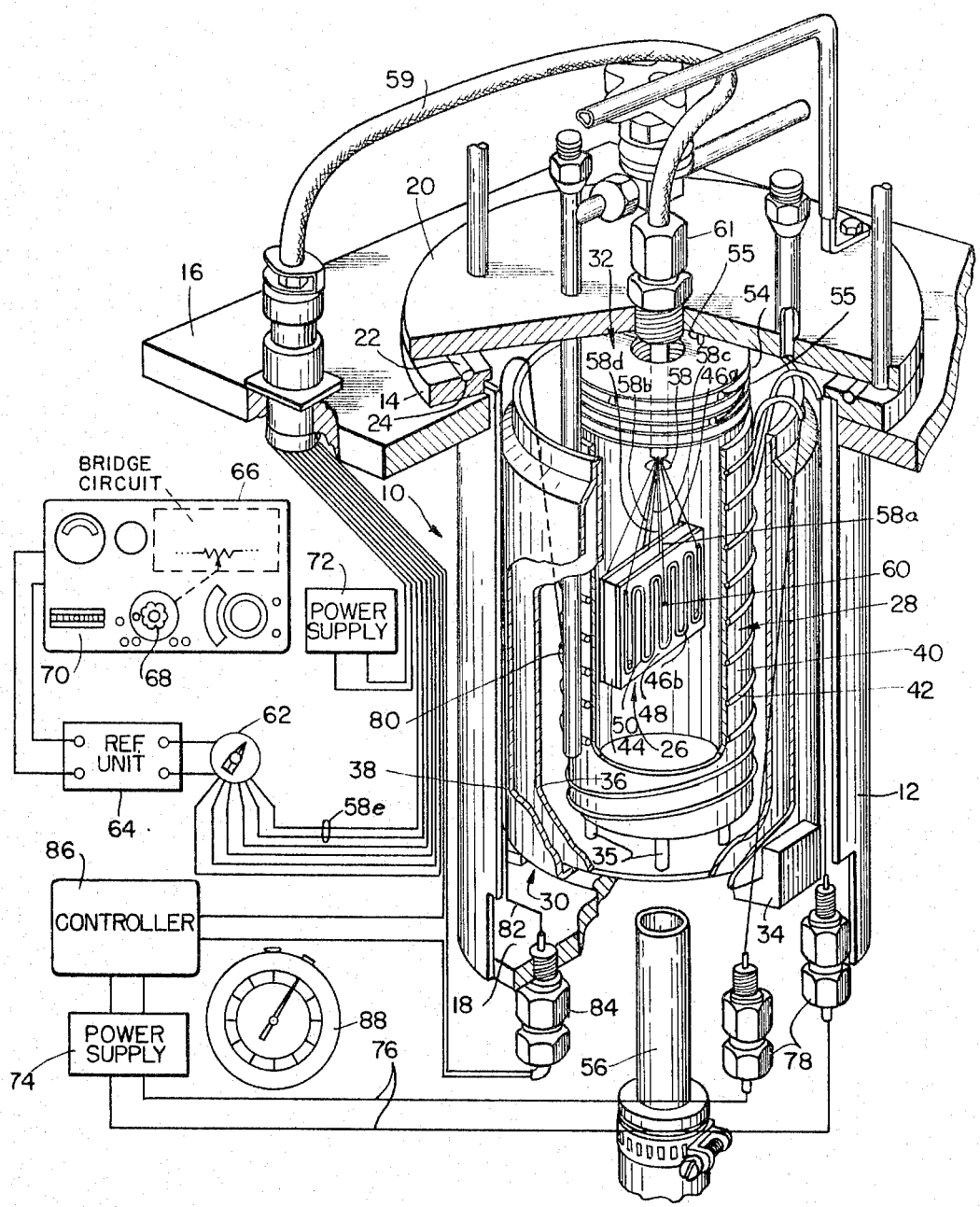

This invention relates to an instrument for the measurement of thermal properties of various materials. More specifically, it relates to an instrument used in accurately measuring the specific heat of a sample under test over a wide range of temperatures. The system uses a novel arrangement to isolate the sample thermally from its environment. Thus, an accurately known amount of heat can be injected into the sample, and one can then monitor the resulting change in its temperature to provide an accurate indication of its specific heat.

The principal object of the invention is to provide an improved instrument for ascertaining a thermal property of a sample related to increments in the quantity of heat therein.

A more specific object of the invention is to provide an instrument for use in measuring the specific heat of a sample.

Another object of the invention is to provide an instrument of the above type capable of use for accurate measurements over a wide range of temperatures.

A further object of the invention is to provide an instrument of the above type characterized by relative ease of operation.

Another object is to provide an improved method for measuring the specific heat of a sample.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawing which is a partly schematic illustration of an instrument embodying the invention, including an isometric, cut-away view of a calorimeter chamber incorporated in the instrument.

In general, the invention facilitates accurate measurement of the specific heat of a sample by recording the change in temperature corresponding to a given increment in the quantity of heat in the sample. The change in heat content is effected by an electrical heater, termed the "main heater," all of whose heat is constrained to flow into a sample-heater unit comprising the sample and the main heater. The rate at which the heat is generated in the main heater can be accurately controlled through control of the electrical power supplied to it. Therefore, within broad limits, the rate at which heat is absorbed by the sample unit can be set at any desired constant level. Thus, the total change in the heat in the sample-heater unit in any time interval can be ascertained by merely multiplying the length of the interval by the power supplied to the main heater.

Operation in the above manner requires that substantially all of the heat from the main heater be retained in the sample-heater unit. To accomplish this, the unit is located in an environment which is maintained at essentially the same temperature as the unit. This minimizes the exchange of heat between the sample-heater unit and the environment and, in particular, there is little flow of heat from the unit into its surroundings.

More specifically, as shown in the drawing, a calorimeter chamber, generally indicated at 10 includes an outer shell 12 welded or brazed at its upper end to a flange 14. The flange 14 rests on a base plate 16 which supports the entire chamber. The shell 12 is closed off at its bottom end by a bottom plate 18 suitably secured in place. Closure of the top of the outer shell is effected by means of a removable cover 20. In order to provide a vacuum seal for the chamber 10, an O-ring gasket 22, resting in an annular groove 24, is disposed between the cover 20 and the flange 14.

A sample unit generally indicated at 26, disposed within the chamber 10, is surrounded laterally and from below by a guard heater generally indicated at 28. The guard heater 28, in turn, is within and spaced from a Dewar tube 30 spaced from the inner surface of the outer shell 12. A radiation shield, generally indicated at 32, is positioned above the open upper end of the guard heater 28.

The Dewar tube 30 is spaced above the bottom plate 18 and coaxially positioned within the outer shell 12 by a plurality of L-shaped supports 34. The supports 34 preferably are of a material having a low thermal conductivity and also they are provided with a minimum cross-section, in order to minimize heat conduction through them between the Dewar tube 30 and the bottom plate 18. Similarly, the guard heater 28 is supported on rods 35 resting on the bottom of the inner shell 36 of the Dewar tube 30, with the rods 35 having as small a cross-section as possible consonant with their strength requirements in order to minimize heat conduction through them between the guard heater 28 and the Dewar tube 30.

In addition to the inner shell 36, the Dewar tube 30 has an outer shell 38, with a vacuum between the two shells. Also, the opposing surfaces of the shells 36 and 38 are preferably made highly reflective in order to minimize transfer of heat between them by means of radiation.

The guard heater 28 comprises a shell 40 surrounded by an electrical heating element 42. The heating element 42 is in continuous contact with the shell 40, such contact being insured by brazing or silver soldering of these parts. Moreover, the shell 40 is of a high thermal conductivity material such as copper. These factors, plus the distribution of the element 42 over the lateral and bottom surfaces of the shell provide a uniform temperature throughout the shell 40, particularly over its inner surface 40a, when the guard heater 28 is heated by means of an electrical current through the element 42.

The sample unit 26 includes the sample to be tested, indicated at 44 and a main heater 46 having two sections 46a and 46b sandwiching the sample 44. Each main heater section comprises a plate 48 provided with a groove on its outer surface to accommodate an electrical heating element 50 as shown.

The heating elements 50 are preferably secured in place and covered over by a suitable process such as silver soldering. The resulting embedding of the elements 50 in the plates 48, coupled with the spatially uniform distribution of the elements over the plate and the use of a high conductivity material such as copper, aluminum or silver for the plates, results in a uniform temperature throughout each of the main heater sections 46a and 46b. This construction also ensures rapid transfer of heat from the heating elements into the plates 48 and the sample 44 sandwiched between them.

The heating elements 50 are trimmed to provide the same electrical resistances and they are connected in series so that they carry the same current.

The radiation shield 32 comprises a series of highly reflective plates 54. The plates 54 are spaced from each other by small rods 55 of low thermal conductivity material and the shield 32 is supported from the cover 20 by similar rods 55.

During the use of the instrument to ascertain thermal characteristics of the sample 44, the sample unit 26 should be thermally isolated from its surroundings, insofar as possible, so that all the heat generated by the heating elements 50 remains within the sample unit. In brief, several features of the chamber 10 combine to provide this result. In the first place, the interior of the chamber 10 is evacuated by means of a conduit 56 extending through the bottom plate 18 and connected to a vacuum pump (not shown). This prevents transfer of heat within the chamber by means of gaseous convection and conduction. Additionally, the guard heater 28 is maintained at the same temperature as the sample-heater unit 26, as described in detail below, substantially preventing transfer of heat between the sample-heater unit and the guard heater.

The only remaining direction in which heat can be transferred to or from the sample unit 26 is through the open top of the guard heater 28. Such transfer can take place in the first instance by conduction along the various electrical leads, collectively shown at 58, connected to the sample unit. These leads, which extend from a cable 59 by way of an adapter 61, are relatively long and of small cross-section. Therefore, only a small amount of heat is transferred along them. It should be noted that the leads 58 provide the dual purpose of supporting the sample unit 26 within the chamber 10 and thus, there are no other conductive paths for heat flow to and from the sample unit.

Heat transfer through the top of the guard heater 28 by radiation is largely inhibited by the radiation shield 32. In effect, looking upward at the highly reflective shield 32 from the sample-heater unit 26, one "sees" a reflection of the unit 26 and other portions of the interior of the guard heater 28. The reflection has essentially the same temperature as the reflected sources, and therefore, there is little transfer of heat by radiation between the shield 32 and the sample unit 26. At the top of the shield 32, there is a similar isolating effect between the shield and the cover 20. The isolating effect of the shield 32 is enhanced by the multiple stage construction involving a plurality of plates 54.

The radiation shield 32 does not provide the same degree of isolation as the guard heater 28. For this reason, the sample unit 26 is suspended on edge as shown, so that the radiation cross-section presented to the radiation shield is the smallest cross-section of the sample unit.

The sample unit 26 also includes thermocouples which indicate the temperatures of various portions thereof. One of these thermocouples, indicated at 60, is affixed to the outer surface of the main heater section 46b. Another thermocouple (not shown) is similarly attached to the outer surface of the section 46a. These main heater thermocouples are connected to the exterior by means of leads 58a and 58b, respectively. Leads 58c and 58d comprise conductors extending to thermocouples (not shown) on opposite surfaces of the sample 44.

The leads 58a–58d are alternatively connected through a selector switch 62 to a reference unit 64. The reference unit provides a voltage equal to the voltage developed by a thermocouple at a reference temperature, e.g., 32° F. This voltage is summed with the thermocouple potential applied to the reference junction and the resultant voltage is fed to a temperature indicator 66.

The indicator 66 is of a conventional type, including a bridge circuit, one of whose arms is a potentiometer having a dial 68 calibrated in terms of temperature or units easily convertible to a temperature reading. The dial 68 is adjusted to balance out the output voltage of the reference unit 64, as indicated by a galvanometer 70. When the galvanometer 70 indicates balance, the reading on the dial 68 corresponds to the temperature of the thermocouple whose output voltage is passed to the reference unit 64 by the switch 62.

Power for the main heater 46 is provided by a regulated power supply 72 connected to the heating elements 70 through leads 58e. Power for the guard heaters 28 is provided by a power supply 74 through leads 76, extending through bushings 78 in the bottom plate 18 and then up and over the top of the Dewar tube 30.

A thermocouple 80 affixed to the guard heater 28 is connected to the exterior of the chamber 10 by means of leads 82 extending over the top of the Dewar tube 30 and then down through a feed-through bushing 84. The leads 58a and 82 are interconnected so as to subtract the thermo-electric potential developed by the thermocouple 60 on the main heater 46 and the thermocouple 80 on the guard heater 28. The resultant potential, which is a measure of the difference in temperature between the sample unit 26 and the guard heater 28, is applied to a guard heater controller 86 which controls the output of the power supply 74. Specifically, the controller 86 functions in a negative feed-back circuit to reduce to zero the difference between the voltage developed by the thermocouples 60 and 80. This, in turn, constrains the guard heater 28 to be at the same temperature as the sample unit 26, which is desired, as pointed out above, to inhibit the flow of heat between these two components.

Operation of the instrument is as follows:

First, the regulated power supply 72 is set to provide a predetermined constant power flow to the main heater 46. Since heat flow from the sample unit 26 is substantially prevented as described above, all of the heat generated by the main heater 46 is retained within the sample unit 26. The rate at which the heat is generated corresponds directly with the output power of the power supply 72.

Next the dial 68 is set to a temperature reading above the initial temperature of the sample unit 26. The selector switch 62 is set to apply the voltage from one of the thermocouples affixed to the sample 44 to the temperature indicator 66. As the temperature of the sample 44 rises, it eventually reaches the level indicated by the dial 68, an occurrence which is readily determined from a zero indication on the galvanometer 70. At this instant, a stop watch 88 is set in motion.

Next the dial 68 is set to a second temperature indication, above the initial setting, e.g., by 10° F. When the samples 44 reaches this second level, the galvanometer 70 again provides a zero indication and the stop watch is stopped at that instant.

The specific heat of the sample 26 over the temperature range between the first and second settings of the dial 68 is then given by $$c_\text{p} = \frac{KP\Delta t}{\Delta T} \qquad (1)$$

where

P is the power delivered by the power supply 72,
$\Delta t$ is the reading on the stop watch 88,
K is a constant relating the heat generated by the main heater 46 to the electrical energy supplied to it, and
$\Delta T$ is the temperature increment between the two readings of the dial 68.

In Equation 1 the power is a constant and therefore, the watch 88 can be calibrated to provide a direct reading of the amount of heat supplied to the sample unit 26 during the time interval required for the sample unit to move from the first temperature setting to the second temperature. Moreover, if a standard temperature increment is used, the watch can be calibrated directly in terms of specific heat.

It will also be apparent that a clock can readily be coupled to the indicator 66 so as to start automatically when the first temperature setting is reached and stop when the second setting is reached.

After the reading on the stop watch 88 has been recorded, the process can be repeated, using a higher pair of temperatures than the first pair. In fact, with a pair of stop watches, one can measure the specific heat of a sample unit 26 over a continuous set of temperature increments.

The specific heat measurement of the sample 44 is obtained by subtracting the specific heat of the main heater 46 from the reading obtained in the above manner for the sample-heater unit 26. The latter figure is obtained by taking specific heat measurements without a sample 44 in the sample-heater unit 26. The readings obtained will then, of course, relate solely to the main heater.

This method and the apparatus used to operate it have certain advantages over the more obvious method of using a predetermined time interval and measuring the temperature at the beginning and end thereof. Specifically, a substantial amount of time is required to make a temperature reading with a bridge balancing system, i.e., the calibrated potentiometer has to be adjusted until the galvanometer indicates a bridge balance, and it is therefore difficult to determine the temperature at a given instant of time with that method. On the other hand, when the bridge is set to a given temperature, as soon as the temperature is reached, there is a balance indication and the stop watch can be started or stopped immediately, as the case may be.

Another way of obtaining information from the apparatus is to use an automatic recording device. This may take the form of a conventional strip chart recorder, which draws a graph showing the heat in the sample as a function of temperature. The slope of the graph at any given point is proportional to the specific heat of the sample at that point. Inflections in the graph indicate phase changes in the sample.

It is often desirable to measure the specific heat of the sample 44 over a temperature range which includes temperatures well below ambient. In the illustrated embodiment of the invention, this is accomplished by first filling the space between the guard heater 28 and the Dewar tube 30 with a suitable coolant such as liquid nitrogen. The nitrogen is introduced into this space by way of a filler pipe 90. As it chills the guard heater and the sample unit 26 disposed therein, the nitrogen evaporates and the gases evolved thereby are withdrawn through the conduit 56. When evaporation is complete, the vacuum pump connected to the conduit 56 will have produced a vacuum within the chamber 10, as indicated by a suitable vacuum gage (not shown). At this point, readings can be taken in the above manner, starting at approximately the low temperature to which the sample unit 26 has been brought and continuing on to a temperature well above ambient, if desired.

Cooling of the sample unit 26 to well below the ambient temperature results in a constraint upon the rate at which heat must be supplied to the sample unit 26 by the heating elements 50 for proper operation of the instrument. Specifically, the rate at which heat is supplied to the sample-heater unit must be sufficient to cause the temperature of the sample unit to rise faster than the rate at which the temperature of the guard heater 28 will rise as a result of heat inflow from the environment.

This follows from the fact that in the illustrated system, the temperature of the guard heater 28 is maintained at the same temperature as the sample-heater unit 26 by means of heat supplied by the heating element 42 on the guard heater. If heat inflow from the exterior of the chamber 10 were to increase the temperature of the guard heater above that of the sample-heater unit 26, the illustrated control system would be unable to provide the temperature equilibrium between these two components required for thermal isolation of the sample unit. By increasing the temperature of the sample-heater unit 26 at a rate faster than the increase in temperature of the guard heater 28 resulting from heat inflow, the temperature of the sample unit is kept above the temperature of an unheated guard heater 28. The guard heater can then be heated by means of the heating element 42 to provide temperature equilibrium in the manner described above.

On the other hand, rapid heating of the sample-heater unit 26 is often undesirable. It decreases the accuracy of the measurements made with the system, and in some cases, it may result in a failure to detect a point of inflection in the temperature-enthalpy characteristic, corresponding to a change of phase in the sample 44.

This problem is greatly alleviated by the triple-wall construction of the chamber 10, which effectively insulates the guard heater 28 from the external environment. More particularly, the insulation includes the spacing of the guard heater 28 from the inner shell 36 of the Dewar tube 30, the insulation provided by the Dewar tube itself and the spacing of the Dewar tube from the outer shell 12 and the bottom plate 18. Also, evacuation of the chamber 10 prevents gaseous transfer of heat. Finally, the outer shell 12 may be surrounded by a jacket of suitable insulating material, e.g., of the foam type.

These insulating components combine together to minimize the flow of heat from the environment into the guard heater 28. The rate of temperature increase of the guard heater, due to heat inflow, is thus kept at a reasonably low value and therefore, the rate at which heat is applied to the sample-heater unit 26 can be kept at a low enough level to provide a large number of accurate specific-heat measurements of the sample 44 over a temperature range extending from —300° F. to well above ambient temperature.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawing shall be interpreted as illustrative and not in a limiting sense.

I claim:
1. Thermal measurement apparatus comprising
   A. a calorimetric guard barrier,
   B. a sample unit
      (1) disposed within and spaced from said guard barrier,
      (2) adapted to support a sample having edges and a pair of opposed surfaces, and
      (3) having a pair of heater plates for supporting engagement with said opposed surfaces of the sample,
   C. means for supplying electrical energy to said heater plates at a pre-determined rate,
   D. means for maintaining said guard barrier at the temperature of said heater plates, and
   E. means for indicating the temperature of the sample.
2. The combination defined in claim 1 in which said indicating means includes:
   A. a temperature sensor responsive to the temperature of said sample,
   B. a bridge circuit responsive to the output of said sensor,
   C. a calibrated potentiometer for balancing said bridge circuit, and
   D. means indicating a balance condition in said bridge circuit.
3. The combination defined in claim 2
   A. including means for timing the interval between two predetermined temperatures of said sample, and
   B. in which said electrical energy supplying means supplies a constant power to each of said heater plates during said interval.
4. Thermal measurement apparatus comprising
   A. a guard barrier defining a cavity having an open end,
   B. a sample unit
      (1) disposed within said cavity,
      (2) spaced from said guard barrier,
      (3) for heating a disk-like sample having edges and a pair of opposing faces, and
      (4) comprising an electrical main heater having opposed heated members arranged to bear against said sample faces to support said sample and apply heat to it,

C. a power supply connected to supply electrical energy to said main heater at a predetermined rate, D. means for maintaining said guard barrier at the temperature of said main heater, and E. a radiation shield substantially closing off said open end of said cavity.

5. The combination defined in claim 4 including means disposing said sample unit with an edge of said sample facing said open end of said cavity.

6. Thermal measurement apparatus for use with a sample having a pair of opposing faces, said apparatus comprising A. a guard barrier defining a cavity having an open end, B. a sample unit
   (1) comprising
       an electrical main heater arranged to compressively engage the opposing faces of said sample
   (2) within said cavity, and
   (3) from said guard barrier, C. a power supply connected to supply electrical energy to said main heater at a predetermined rate, D. means for maintaining said guard barrier at the temperature of said main heater, E. a radiation shield substantially closing off said open end of said cavity, F. a Dewar tube encircling and spaced from said guard barrier, G. an outer housing enclosing and spaced from said Dewar tube, and H. means for providing a vacuum within said outer housing.

7. Thermal measurement apparatus for use with a disk-like sample having edges and a pair of opposing faces, said apparatus comprising A. a guard barrier defining a cavity having an open end, B. a sample unit
   (1) comprising
       an electrical main heater having a pair of sections, each of said sections being arranged to bear against one of said sample faces,
   (2) disposed within said cavity, and
   (3) spaced from said guard barrier, C. a power supply connected to supply electrical power to said main heater, D. means maintaining said guard barrier at the temperature of said main heater, E. thermal isolating means substantially closing said open end of said cavity, F. wires extending from the exterior of said cavity and supporting said sample unit with one of said edges of said sample unit facing said thermal isolating means, and G. means for indicating the temperature of said sample, said temperature indicating means including a sensor responsive to said temperature of said sample.

8. The combination defined in claim 7 including thermal isolating means around said guard barrier, said thermal isolating means including A. a Dewar tube encircling and spaced from said guard barrier, and B. an outer housing enclosing and spaced from said Dewar tube.

9. Thermal measuring apparatus comprising

A. a guard heater defining a cavity having an open end,

B. a sample unit
   (1) for heating a disk-like sample having an edge and a pair of faces, and
   (2) comprising an electrical main heater having a pair of disk-like sections shaped to engage said sample with said sections in contact with and substantially congruent with said faces of said sample, C. thermal isolating means substantially closing off said open end of said cavity, D. electrical leads extending into said cavity through said thermal isolating means, E. said electrical leads supporting said sample unit within said cavity with
   (1) said sample unit spaced from said guard barrier and said thermal isolating means, and
   (2) said edge of said sample facing said thermal isolating means, F. a power supply connected to deliver electrical energy to said main heater at a substantially constant predetermined rate, G. means maintaining said guard barrier at the temperature of said main heater, H. means for indicating the temperature of said sample, said temperature indicating means including
   (1) a sensor responsive to said sample temperature,
   (2) a bridge circuit responsive to the output of said sensor,
   (3) a calibrated element for balancing said bridge circuit,
   (4) means indicating a balance condition in said bridge circuit,
   (5) said calibrated element indicating the temperature of said sensor when said balance condition exists.

10. The combination defined in claim 9 including means for timing the interval between two predetermined temperatures of said sample.

References Cited by the Examiner

UNITED STATES PATENTS 3,078,708  2/1963  McClintock _____ 73—15.6

OTHER REFERENCES

"Calorimeter with Automatic Control," article by Bullock, in the Journal of Scientific Instruments, vol. 36, January 1959, p. 20–22.

"Adiabatic Calorimeter for Metals in the Range 50 to 1000° C.," article by Stansbury et al., in The Review of Scientifiic Instruments, vol. 30, No. 2, February 1959, p. 121–126.

"Adiabatic Calorimeter for Small Samples," article by Tunnicliff et al., in The Review of Scientific Instruments, vol. 31, No. 9 September 1960, p. 953–958.

"Dynamic Adiabatic Calorimeter: An Improved Calorimetrical Apparatus," article by Solomons et al., in The Review of Scientific Instruments, vol. 35, No. 3, March 1964, p. 307–310.

RICHARD C. QUEISSER, *Primary Examiner.*

J. C. GOLDSTEIN, *Assistant Examiner.*

Disclaimer 3,266,307.—*Francis de Winter*, Cambridge, Mass. ADIABATIC CALO-
RIMETER. Patent dated Aug. 16, 1966. Disclaimer filed Oct. 21,
1966, by the inventor and assignee, *Dynatech Corporation*.
Hereby enter this disclaimer to claims 1 through 10 inclusive of said patent.
[*Official Gazette November 29, 1966.*]